March 4, 1958 S. S. MACK 2,825,464
WATER TREATMENT DEVICE
Filed Jan. 22, 1954

United States Patent Office 2,825,464
Patented Mar. 4, 1958

2,825,464

WATER TREATMENT DEVICE

Sidney S. Mack, Jacksonville, Fla., assignor to Packard Water Conditioners, Inc., Jacksonville, Fla., a corporation of Florida Application January 22, 1954, Serial No. 405,546

1 Claim. (Cl. 210—222)

This invention pertains to water treatment devices, and more particularly relates to devices incorporating permanent magnets for the treatment of water containing calcium salts.

An object of the invention is to provide a simple and inexpensive device for subjecting water to a magnetic field and predetermined subsequent dispersion and agitation.

The novel features which are believed to be characteristic of this invention are set forth with particularity in the appended claim. The invention itself, however, both as to its organization and method of operation, together with further objects and advantages thereof, may best be understood by reference to the following description taken in connection with the accompanying drawing, in which:

Figure 1:
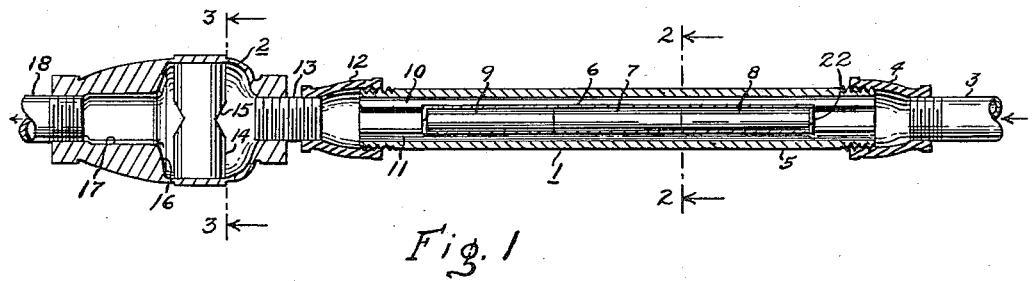
Fig. 1 is a sectional side elevation of a device in accord with this invention.

Referring to Fig. 1 of the drawings, the water treatment device comprises an elongated cylindrical magnetic treatment portion indicated generally at 1, and a bulbous dispersing and agitating portion indicated generally at 2. Water to be treated is supplied to the device at an inlet end through inlet pipe 3, as indicated by the arrow. Inlet pipe 3 is coupled by expanding sleeve 4 to a hollow cylindrical pipe section 5 formed of wrought iron or a similar magnetically highly permeable ferrous metal. The section 5 is coated internally to prevent corrosion, as by galvanizing. The internal diameter of pipe section 5 may be 1 inch and the overall length of the section may be 12 inches for an inlet pipe 3 of nominally ¾ inch size. It has been found that the ratio of internal diameter to length of the section 5 should be not less than about 1:10 and is preferably 1:12. The wall of section 5 should have a thickness of between about one-fifth and one-tenth of the internal diameter of the section, assuming the material to be wrought iron or other ferrous metal of similar permeability, and a thickness of one-eighth inch is appropriate in a device having other dimensions herein given as exemplary in a device for use with a ¾ inch water pipe line.

A hollow closed and sealed cylinder 6 having relatively thin non-magnetic walls is arranged coaxially within section 5 and cylinder 6 should have an inner diameter equal to not less than about one-half of the inner diameter of section 5. The walls of cylinder 6 may be, for example, of about one-thirty-second of an inch in thickness. Within the cylinder 6, three solid cylindrical permanent magnet bars are arranged in end-to-end relationship, the poles at the ends of the intermediate magnet 7 being disposed toward respectively like poles of the end magnets 8 and 9. Thus if magnet 8 is oriented to have a north pole toward the inlet pipe 3 and a south pole adjacent magnet 7, magnet 7 is oriented to have its south pole adjacent the south pole of magnet 8. Similarly, the north pole of magnet 9 will be disposed immediately adjacent the north pole of magnet 7, while the south pole of magnet 9 will be arranged toward the outlet end of section 5. The end walls of the cylinder 6, as will be apparent from Fig. 1, retain the magnets within the cylinder and maintain the aforesaid immediate adjacency of the ends of magnet 7 to the respective ends of magnets 8 and 9.

Figure 2:
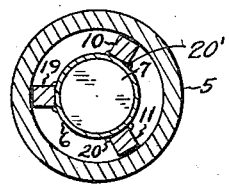
Fig. 2 is a sectional view of the device on enlarged scale taken along line 2—2 of Fig. 1.

Cylinder 6 is retained in coaxial position within section 5 by means of spacers which may comprise elongated bars 10 and 11, square in cross section, and soldered to the outer surface of cylinder 6. Three such bars are preferably provided, and the bars may be approximately equal in length to section 5, such as twelve inches, and arranged to prevent the cylinder containing magnets 7, 8 and 9 from becoming longitudinally displaced from its desired position within pipe 5. It will be understood that the ends of spacers 10 and 11 will meet some part of the inner wall of the inlet expander 4 or the outlet reducer 12 of the magnetic treatment section 1, or will contact the coupling 13 or the pipe 3, whenever the cylinder 6 moves a short distance in either direction, and the purpose of the extended length of bars 10 and 11 is primarily to limit such motion sufficiently to keep cylinder 6 well within the pipe section 5. While only two spacer bars 10 and 11 are seen in the sectional view of Fig. 1, it will be understood that a third identical bar is preferably provided as indicated in Fig. 2 later described.

The outlet reducer 12 of the magnetic treatment portion 1 screws to the outlet end in the same manner that inlet expander 4 screws to the inlet end. Following magnetic treatment, the water entering reducer 12 is directed into a short externally threaded coupling 13, having at least as great an inner diameter as that of the inlet pipe 3, and from coupling 13 the water is delivered into the bulbous dispersing chamber of portion 2 along the longitudinal axis. In dispersing chamber 2, the incoming water meets a transversely extending solid cylindrical dispersing member 14 and is particularly directed into a notch or groove 15 extending across the portion of member 14 which faces the coupling 13. The water is severely agitated by the grooved portion of the dispersing member and further agitated as it swirls outwardly toward the walls of the chamber. After passing around the member 14, the water is further agitated as it is directed inwardly by inwardly extending shoulder 16 toward an outlet passage 17 for delivery to outlet pipe 18.

Portion 2, the agitating and dispersing portion of the treatment device, is formed of cast iron. For convenience and economy of manufacture, the cylindrical dispersing member 14 is cast, together with the shoulders 16 and the walls, as an integral part of portion 2. The dispersing chamber may have, in the specific example given, a maximum internal diameter of about two and one-half inches and overall outside length of five and one-half inches, and the dispersing member 14 may be one inch in diameter.

Magnets 7, 8 and 9 are of a material providing a high flux density and great permanence or high retentivity, such as is exhibited by sintered alloys of aluminum, nickel, cobalt and iron, and commonly known as alnico. Each magnet, if pipe section 5 is 1 inch in internal diameter and 12 inches long, may be 3 inches long and ½ inch in diameter. The cylinder 6 should fit about the magnets with very little clearance. It is important for several reasons to provide a close fitting non-magnetic housing 6 for the magnets. Since like poles of adjacent magnets are arranged to be together, highly concentrated flux fields exist between the magnet poles and the magnetic pipe section 5. Furthermore, if the magnet housing cylinder 6 were of too great internal diameter, the magnets would pull out of axial arrangement and the flux fields would be undesirably less intense for those portions of each magnet which were furthest from the pipe section 5.

The sectional view of Fig. 2 shows the arrangement of spacer bars 10, 11 and 19, each of which is soldered, as at 20, to the outer wall surface of cylinder 6. The cylinder, containing magnet 7, is retained in coaxial alignment within pipe section 5 by the three spacer bars, the bars being in free contact with the inner wall surface of pipe 5.

Figure 4:
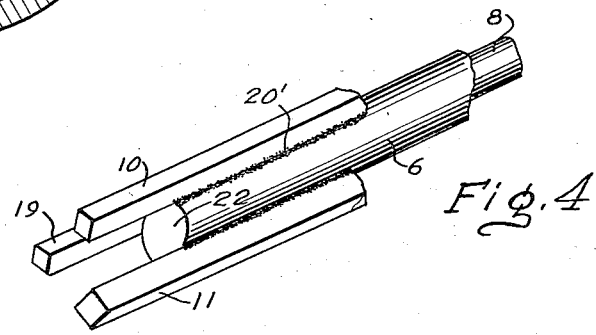
Fig. 4 is a detail perspective view of a broken away portion of a magnet and cylinder assembly included in the device, on substantially the same scale as Fig. 2.

Details of the magnet and cylinder arrangement are further shown in Fig. 4, wherein spacer bars 11 and 19 are seen to be soldered, as at 20', to the cylinder 6, which encloses the magnet elements, including element 8, and wherein the spacer bars are seen to project beyond the closed end 22 of the cylinder 6.

Figure 3:
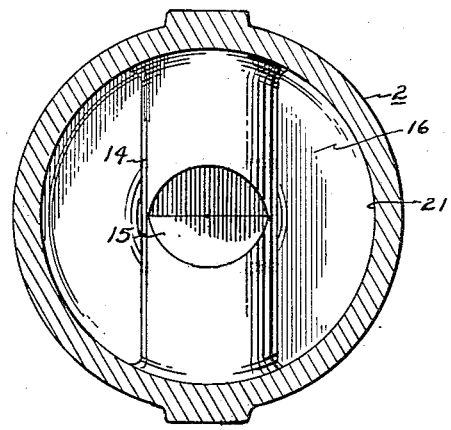
Fig. 3 is a sectional view of the device on the enlarged scale of Fig. 2 and taken along line 3—3 of Fig. 1.

Fig. 3 is a sectional view, on the same scale as Fig. 2, taken along line 3—3 of Fig. 1, to show the cylindrical transverse dispersing member 14 extending across the circular dispersing chamber formed interiorly of portion 2. Notch 15 is seen to face the incoming stream of water, which, as heretofore mentioned, is directed into the dispersing chamber along the chamber axis. The stream of entering water is thoroughly agitated as it is directed toward the side walls 21 of the chamber and as it is further directed inwardly by the shoulders 16 toward the cylindrical outlet passage shown in Fig. 1.

The device herein described is particularly useful with hard water containing calcium salts, herein called calcareous water. The effect of passing such water through the device is that the apparent hardness of the water is reduced. Better soapsuds are obtained with water which has been treated in the device, and scale formation in boilers and hot water heaters is reduced if the water is first treated in the device.

The reasons for the change in the water which results from the magnetic treatment in section 1 and the dispersion and agitation in the unmagnetized magnetic material dispersing section 2 is not entirely understood. It is believed, however, that the molecules of calcium carbonate and other scale forming salts are in some way polarized or depolarized by the combination of passage through the strong magnetic fields existing between the magnet poles and the wrought iron pipe 5 and the subsequent violent agitation in the presence of unmagnetized but magnetic ferrous metal of the dispersion section. An inexplicable effect is the apparent reduction in pH factor of water originally having a pH of greater than 7, and a slight increase in pH of water originally on the acid side of pH 7. All of the mentioned effects occur without the adding of any substance to the water and without removing anything from the water, but occur merely as a result of the passage of the water through the device.

Experiments indicate that the rate of flow of water through the device is not important, apparently because the greater time of exposure to the magnetic fields and greater contact time with the iron of the dispersing chamber in the case of relatively slow rates of flow give approximately the same results as the more abrupt changes in the magnetic field direction and intensity through any one discrete volume of water as that volume moves along section 1 past the magent poles and the greater agitation which occur with more rapid flow.

While one preferred embodiment of this invention has been shown and described by way of illustration, many modifications will occur to those skilled in the art and it is, therefore, desired that it be understood that it is intended in the appended claim to cover all such modifications as fall within the true spirit and scope of this invention.

What is claimed as new and what it is desired to secure by Letters Patent of the United States is:

An apparatus for the treatment of calcareous water comprising a ferrous metal pipe having a predetermined internal diameter, a length dimension at least about 10 times said diameter and walls with a thickness dimension at least about one-tenth of said diameter, a thin walled closed hollow cylinder of non-magnetic metal in said pipe, said cylinder having a diameter less than about three-quarters of said pipe diameter but at least about one-half of said pipe diameter and having a length less than that of said pipe but at least about 8 times said pipe diameter, at least three solid cylindrical bar magnets of high flux density and high retentivity disposed in said cylinder and proportioned substantially to fill the hollow interior thereof, said magnets being arranged in line with the north pole end of one of the end magnets against the north pole end of an intermediate magnet and the south pole end of said intermediate magnet against the south pole end of a third magnet, non-magnetic metal spacers disposed externally of said cylinder and proportioned to maintain said cylinder coaxially within said pipe, said pipe having an inlet end and an opposite outlet end, whereby water entering said inlet end of said pipe flows between said cylinder and the wall of said pipe for magnetic treatment, and issues from said outlet end.

References Cited in the file of this patent

UNITED STATES PATENTS

| | | |
|---|---|---|
| 2,289,494 | Hadley et al. | July 14, 1942 |
| 2,597,561 | Blind | May 20, 1952 |
| 2,611,490 | Robinson | Sept. 23, 1952 |
| 2,635,754 | Stem | Apr. 21, 1953 |
| 2,652,925 | Vermeiren | Sept. 22, 1953 |
| 2,678,729 | Spodig | May 18, 1954 |

FOREIGN PATENTS

| | | |
|---|---|---|
| 697,826 | Germany | Oct. 24, 1940 |

OTHER REFERENCES

Journal of the Electrochemical Society, vol. 100, No. 8, Aug. 1953, p. 209C.